(12) United States Patent
Mir et al.

(10) Patent No.: US 6,694,287 B2
(45) Date of Patent: Feb. 17, 2004

(54) PHASE ANGLE DIAGNOSTICS FOR SINUSOIDAL CONTROLLED ELECTRIC MACHINE

(75) Inventors: Sayeed A. Mir, Saginaw, MI (US); Mark P. Colosky, Vassar, MI (US)

(73) Assignee: Delphi Technologies, Inc., Troy, MI (US)

( * ) Notice: Subject to any disclaimer, the term of this patent is extended or adjusted under 35 U.S.C. 154(b) by 218 days.

(21) Appl. No.: 09/943,260

(22) Filed: Aug. 30, 2001

(65) Prior Publication Data

US 2003/0046028 A1 Mar. 6, 2003

(51) Int. Cl.$^7$ ................................ G06F 11/30
(52) U.S. Cl. ...................... 702/183; 318/565
(58) Field of Search ................ 702/183, 35, 36, 702/38, 41, 57, 58, 59, 64, 66, 79, 94, 105, 145, 150, 151, 176, 182, 184; 318/565, 606–608, 700, 727, 799, 800–805; 700/26, 28, 108, 174, 206; 73/116, 862.192, 862.193; 714/2, 15, 25, 30, 46, 798

(56) References Cited

U.S. PATENT DOCUMENTS

| | | | |
|---|---|---|---|
| 3,919,609 A | 11/1975 | Klautschek et al. | 318/227 |
| 4,027,213 A | 5/1977 | de Valroger | 318/138 |
| 4,217,508 A | 8/1980 | Uzuka | 310/46 |
| 4,240,020 A | 12/1980 | Okuyama et al. | 318/721 |
| 4,300,081 A | 11/1981 | Van Landingham | 318/599 |
| 4,392,094 A | 7/1983 | Kuhnlein | 318/254 |
| 4,447,771 A | 5/1984 | Whited | 18/661 |
| 4,458,192 A | 7/1984 | Sakamoto et al. | 318/798 |
| 4,511,827 A | 4/1985 | Morinaga et al. | 318/254 |
| 4,556,811 A | 12/1985 | Hendricks | 310/266 |
| 4,628,499 A | 12/1986 | Hammett | 364/167 |
| 4,661,756 A | 4/1987 | Murphy et al. | 318/701 |
| 4,691,269 A | 9/1987 | Yamane et al. | 363/41 |
| 4,780,658 A | 10/1988 | Koyama | 318/818 |
| 4,789,040 A | 12/1988 | Morishita et al. | 180/142 |
| 4,825,132 A | 4/1989 | Gritter | 318/811 |
| 4,868,477 A | 9/1989 | Anderson et al. | 318/696 |
| 4,868,970 A | 9/1989 | Schultz et al. | 29/596 |
| 4,882,524 A | 11/1989 | Lee | 318/254 |

(List continued on next page.)

FOREIGN PATENT DOCUMENTS

| | | |
|---|---|---|
| EP | 1 087 516 A2 | 3/2001 |
| WO | WO 01/20751 A2 | 3/2001 |
| WO | WO 01/20766 A1 | 3/2001 |

OTHER PUBLICATIONS

"Indirect Rotor Position Sensing in Real Time for Brushless Permanent Magnet Motor Drives"; Authors: Nesimi Ertugrul and Paul P. Acarnley; IEEE Transactions On Power Electronic, vol. 13, No. 4, Jul. 1998; pp. 608–616_.

New Adaptive Sliding Observer for Sensorless Control of Surface Permanent Magnet Synchronous Motor; Authors: Zhiqian Chen, Mutuwo Tomita, Shinji Doki and Shigeru Okuma; pp. 180–185.

*Primary Examiner*—Marc S. Hoff
*Assistant Examiner*—Edward Raymond
(74) *Attorney, Agent, or Firm*—Michael D. Smith (57) ABSTRACT

A method and system for phase angle diagnostics in a sinusoidally excited PM electric machine, including: a controller that executes a process to facilitate the method including receiving a position value indicative of the rotational position from a position sensor configured to measure a rotor position of said electric machine and transmit a position signal; receiving a phase advance value indicative of a commanded phase advance angle; determining an expected phase voltage and expected status thereof; observing a selected phase voltage signal and determining an actual status corresponding thereto; and comparing the expected status and the actual status.

96 Claims, 6 Drawing Sheets

U.S. PATENT DOCUMENTS

| | | | |
|---|---|---|---|
| 5,063,011 A | 11/1991 | Rutz et al. | 264/126 |
| 5,069,972 A | 12/1991 | Versic | 428/407 |
| 5,122,719 A | 6/1992 | Bessenyei et al. | 318/629 |
| 5,155,419 A | 10/1992 | Naito | 318/254 |
| 5,223,775 A | 6/1993 | Mongeau | 318/432 |
| 5,257,828 A | 11/1993 | Miller et al. | 180/79.1 |
| 5,319,294 A | 6/1994 | Ohto et al. | 318/568.22 |
| 5,444,341 A | 8/1995 | Kneifel, II et al. | 318/432 |
| 5,451,900 A | 9/1995 | Haga et al. | 330/10 |
| 5,469,215 A | 11/1995 | Nashiki | 318/432 |
| 5,579,188 A | 11/1996 | Dunfield et al. | 360/99.08 |
| 5,616,999 A | 4/1997 | Matsumura et al. | 318/632 |
| 5,625,239 A | 4/1997 | Persson et al. | 310/68 B |
| 5,625,542 A | 4/1997 | Stemmler et al. | 363/41 |
| 5,646,496 A | 7/1997 | Woodland et al. | 318/632 |
| 5,672,944 A | 9/1997 | Gokhale et al. | 318/254 |
| 5,760,562 A | 6/1998 | Woodland et al. | 318/632 |
| 5,777,449 A | 7/1998 | Schlager | 318/459 |
| 5,780,986 A | 7/1998 | Shelton et al. | 318/432 |
| 5,839,537 A | 11/1998 | Nishino et al. | 180/443 |
| 5,852,355 A | 12/1998 | Turner | 318/701 |
| 5,867,380 A | 2/1999 | Lee | 363/98 |
| 5,898,990 A | 5/1999 | Henry | 29/598 |
| 5,920,161 A | 7/1999 | Obara et al. | 318/139 |
| 5,963,706 A | 10/1999 | Baik | 388/804 |
| 5,977,740 A | 11/1999 | McCann | 318/701 |
| 5,988,310 A | 11/1999 | Nishino et al. | 180/443 |
| 5,998,945 A | 12/1999 | Elliott | 318/254 |
| 6,002,226 A | 12/1999 | Collier-Hallman et al. | 318/439 |
| 6,008,599 A | 12/1999 | Beck | 318/254 |
| 6,013,994 A | 1/2000 | Endo et al. | 318/432 |
| 6,046,560 A | 4/2000 | Lu et al. | 318/432 |
| 6,049,473 A | 4/2000 | Jang et al. | 363/89 |
| 6,051,942 A | 4/2000 | French | 318/254 |
| 6,070,692 A | 6/2000 | Nishino et al. | 180/443 |
| 6,104,150 A | 8/2000 | Oohara et al. | 318/254 |
| 6,107,767 A | 8/2000 | Lu et al. | 318/561 |
| 6,124,688 A | 9/2000 | Coles et al. | 318/254 |
| 6,152,254 A | 11/2000 | Phillips | 180/422 |
| 6,184,638 B1 | 2/2001 | Kinpara | 318/432 |
| 6,226,998 B1 * | 5/2001 | Reason et al. | 62/230 |
| 6,281,659 B1 | 8/2001 | Giuseppe | 318/799 |
| 6,362,586 B1 * | 3/2002 | Naidu | 318/432 |
| 6,370,459 B1 | 4/2002 | Phillips | 701/41 |
| 6,373,211 B1 | 4/2002 | Henry et al. | 318/432 |

* cited by examiner

PHASE ANGLE DIAGNOSTICS FOR SINUSOIDAL CONTROLLED ELECTRIC MACHINE

BACKGROUND

Most modern vehicles have power steering in which the force exerted by the operator on the steering wheel is assisted by hydraulic pressure from an electric or engine-driven pump. The force applied to the steering wheel is multiplied by the mechanical advantage of a steering gear. In many vehicles, the steering gear is a rack and pinion, while in others it is a recirculating ball type.

Electric power steering is commonly used in the hybrid vehicles to improve fuel economy and has started to replace hydraulic power steering in some vehicles. One way this is accomplished is through the reduction or elimination of losses inherent in traditional steering systems. Therefore, electric power steering typically requires power only on demand. Commonly, in such systems an electronic controller is configured to require significantly less power under a small or no steering input condition. This dramatic decrease from conventional steering assist is the basis of the power and fuel savings. Electric power steering has several additional advantages. The steering feel provided to the operator has greater flexibility and adaptability. Overall system mass savings may also be achieved. Electric power steering is powerplant independent, which means it can operate during an all-electric mode on a vehicle.

Furthermore, polyphase permanent magnet (PM) brushless motors excited with a sinusoidal field provide lower torque ripple, noise, and vibration when compared with those excited with a trapezoidal field. Theoretically, if a motor controller produces polyphase sinusoidal currents with the same frequency and phase as that of the sinusoidal back electromotive force (EMF), the torque output of the motor will be a constant, and zero torque ripple will be achieved. However, due to practical limitations of motor design and controller implementation, there are always deviations from pure sinusoidal back EMF and current waveforms. Such deviations usually result in parasitic torque ripple components at various frequencies and magnitudes. Various methods of torque control can influence the magnitude and characteristics of this torque ripple.

One method of torque control for a permanent magnet motor with a sinusoidal, or trapezoidal back EMF is accomplished by directly controlling the motor phase currents. This control method is known as current mode control. The phase currents are actively measured from the motor phases and compared to a desired profile. The voltage across the motor phases is controlled to minimize the error between the desired and measured phase current. However, current mode control requires a more complex controller for digital implementation and processing. The controller would also require multiple current sensors and A/D channels to digitize the feedback from current sensors, which would be placed on the motor phases for phase current measurements.

Another method of torque control is termed voltage mode control. In voltage mode control, the motor phase voltages are controlled in such a manner as to maintain the motor flux sinusoidal and motor back emf rather than current feedback is employed. Voltage mode control also typically provides for increased precision in control of the motor, while minimizing torque ripple. One application for an electric machine using voltage mode control is the electric power steering system (EPS) because of its fuel economy and ease-of-control advantages compared with the traditional hydraulic power steering.

In voltage mode control the amplitude and phase angle of phase current vector is calculated based on the motor back emf, position and motor parameters (e.g., resistance, inductance and back emf constant). A sinusoidal instantaneous line voltage based on the calculated phase and amplitude vector of phase voltage is applied across the motor phases. An instantaneous value of voltage is realized across the phases by applying a pulse width modulated (PWM) voltage the average of which is equal to the desired instantaneous voltage applied at that position of the motor.

There are different methods of profiling the phase voltages in order a achieve a sinusoidal line to line voltage and therefore the phase current in a wye-connected motor. A conventional approach is to apply sinusoidal voltages at the phase terminals. In this method the reference for the applied voltage is at half the dc bus voltage (Vdc/2). Another approach is the phase to grounding, phase voltage method, which increases the voltage resolution and reduces switching losses. In this method, the phase voltage is referenced to the power supply ground (instead of Vdc/2 as in conventional way). This ground reference is achieved by applied a zero voltage for 120 electrical degrees at each phase terminal during one electric cycle.

EPS control systems employing voltage mode control algorithms, generally use the amplitude and phase angle of the voltage for torque control. In order to produce the accurate torque from the motor it is important to apply and control both amplitude of the voltage and its phase angle as accurately as possible. Errors in the phase angle may produce inaccurate torque. An error high enough to cause the angle between back emf and current of more than 90 degrees, may cause a reversal of torque and thus the motor direction. Therefore, in a voltage control system, it may be desirable to monitor the motor voltage phase angle and determine if it appears to be reasonable.

BRIEF SUMMARY

A method and system for phase angle diagnostics in a sinusoidally excited PM electric machine, including: a controller that executes a process to facilitate the method including receiving a position value indicative of the rotational position from a position sensor configured to measure a rotor position of said electric machine and transmit a position signal; receiving a phase advance value indicative of a commanded phase advance angle; determining an expected phase voltage and expected status thereof; observing a selected phase voltage signal and determining an actual status corresponding thereto; and comparing the expected status and the actual status to ascertain the phase angle reasonableness.

A storage medium encoded with a machine-readable computer program code for phase angle diagnostics in a sinusoidally excited PM electric machine, the storage medium including instructions for causing controller to implement the disclosed method.

A computer data signal embodied in a carrier wave for phase angle diagnostics in a sinusoidally excited PM electric machine, the data signal comprising code configured to cause a controller to implement the disclosed method.

BRIEF DESCRIPTION OF THE DRAWINGS

The present invention will now be described, by way of an example, with references to the accompanying drawings, wherein like elements are numbered alike in the several figures in which.

DETAILED DESCRIPTION OF THE PREFERRED EMBODIMENT

Figure 2:
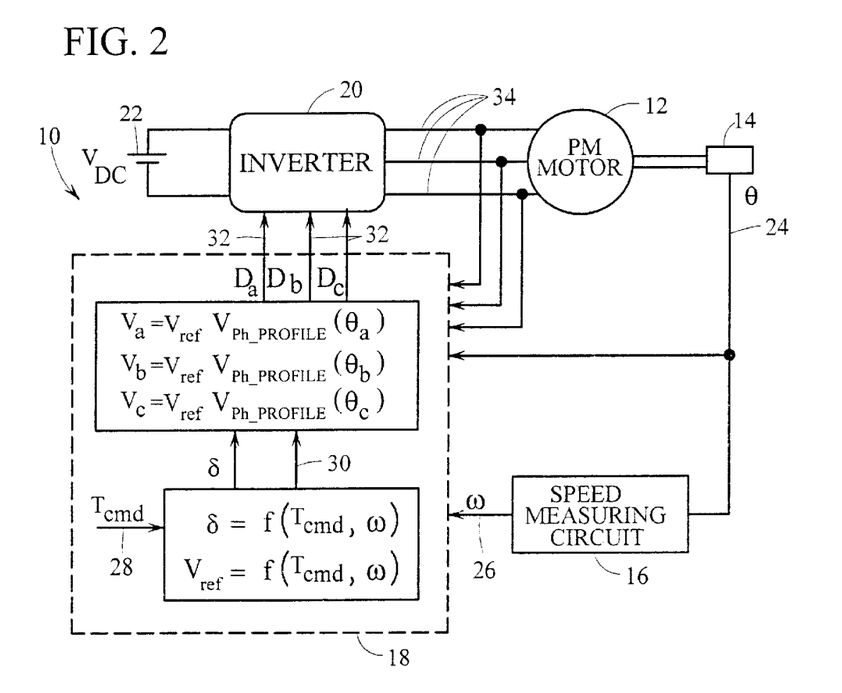
FIG. 2 is a drawing depicting a voltage mode controlled PM motor drive system.

Referring now to the drawings in detail, FIG. 2 depicts a PM motor system 10 where numeral 10 generally indicates a system for controlling the torque of a sinusoidally excited PM electric machine 12 (e.g. a motor, hereinafter referred to as a motor). The system includes, but is not limited to, a motor rotor position encoder 14, a speed measuring circuit (or algorithm) 16, a controller 18, power circuit or inverter 20 and power source 22. Controller 18 is configured to develop the necessary voltage(s) out of inverter 20 such that, when applied to the motor 12, the desired torque is generated. Because these voltages are related to the position and speed of the motor 12, the position and speed of the rotor are determined. A rotor position encoder 14 is connected to the motor 12 to detect the angular position of the rotor denoted θ. The encoder 14 may sense the rotary position based on optical detection, magnetic field variations, or other methodologies. Typical position sensors include potentiometers, resolvers, synchros, encoders, and the like, as well as combinations comprising at least one of the forgoing. The position encoder 14 outputs a position signal 24 indicating the angular position of the rotor.

A motor speed denoted $\omega_m$ may be measured, calculated or a combination thereof. Typically, the motor speed $\omega_m$ is calculated as the change of the motor position θ as measured by a rotor position encoder 14 over a prescribed time interval. For example, motor speed $\omega_m$ may be determined as the derivative of the motor position θ from the equation $\omega_m = \Delta\theta/\Delta t$ where $\Delta t$ is the sampling time and $\Delta\theta$ is the change in position during the sampling interval. In the figure, a speed measuring circuit 16 determines the speed of the rotor and outputs a speed signal 26.

The position signal 24, speed signal 26, and a torque command signal 28 are applied to the controller 18. The torque command signal 28 is representative of the desired motor torque value. The controller 18 processes all input signals to generate values corresponding to each of the signals resulting in a rotor position value, a motor speed value, a temperature value and a torque command value being available for the processing in the algorithms as prescribed herein. Measurement signals, such as the above-mentioned are also commonly linearized, compensated, and filtered as desired or necessary to enhance the characteristics or eliminate undesirable characteristics of the acquired signal. For example, the signals may be linearized to improve processing speed, or to address a large dynamic range of the signal. In addition, frequency or time based compensation and filtering may be employed to eliminate noise or avoid undesirable spectral characteristics.

Figure 4:
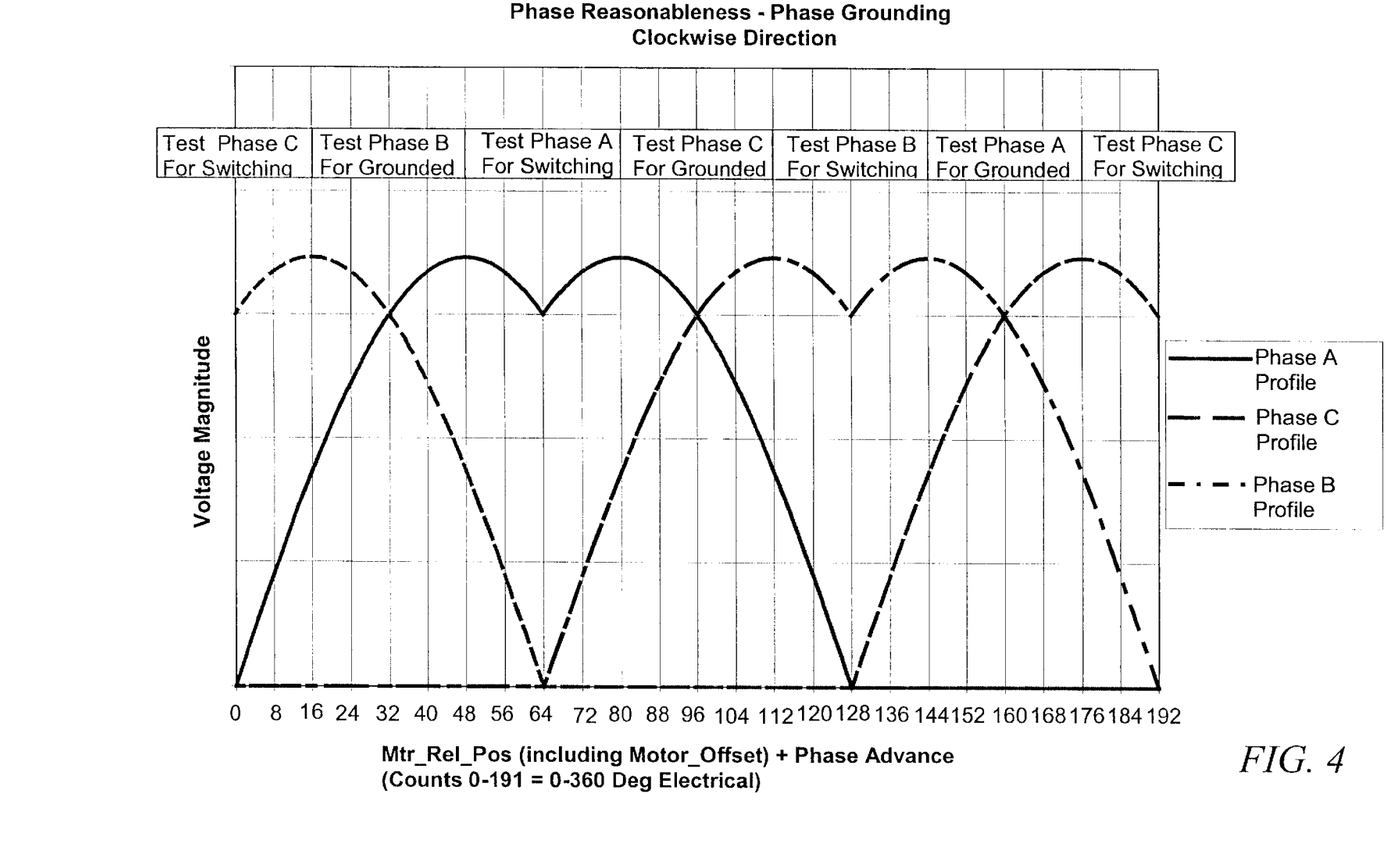
FIG. 4 is a diagrammatic view of the signals employed as a function of electrical angle count in an exemplary embodiment.

The controller 18 determines the voltage amplitude $V_{ref}$ 30 and its phase advance angle δ, required to develop the desired torque by using the position signal 24, speed signal 26, and torque command signal 28, and other fixed motor parameter values. For a three-phase motor, three sinusoidal reference signals that are synchronized with the motor back EMF $\overline{E}$ are utilized to generate the motor input voltages. The controller 18 transforms the voltage amplitude signal $V_{ref}$ 30 into three phases by determining phase voltage command signals $V_a$, $V_b$, and $V_c$ from the voltage amplitude signal 30 and the position signal 24 according to the following equations:

$$V_a = V_{ref} * V_{ph\_Profile}(\theta_a)$$

$$V_b = V_{ref} * V_{ph\_Profile}(\theta_b)$$

$$V_c = V_{ref} * V_{ph\_Profile}(\theta_c)$$

where $V_{ph\_Profile}(\theta_a)$, $V_{ph\_Profile}(\theta_b)$, $V_{ph\_Profile}(\theta_c)$ are thee profile voltages as shown in FIG. 4, and are generated from the sine functions as shown in the following equations:

$$V_{ph\_Profile}(\theta_a) = \text{Sin}(\theta_a) - \min[\sin(\theta_a), \sin(\theta_b), \sin(\theta_c)]$$

$$V_{ph\_Profile}(\theta_b) = \text{Sin}(\theta_b) - \min[\sin(\theta_a), \sin(\theta_b), \sin(\theta_c)]$$

$$V_{ph\_Profile}(\theta_c) = \text{Sin}(\theta_c) - \min[\sin(\theta_a), \sin(\theta_b), \sin(\theta_c)]$$

These functions are used to generate a phase to grounding phase voltage waveform. These functions may be generated from the sine functions off line and stored in the table form or may be calculated using the above equation. $\theta_a$, $\theta_b$, and $\theta_c$ are three, phase voltage angles shifted by 120 electric degrees.

Figure 1:
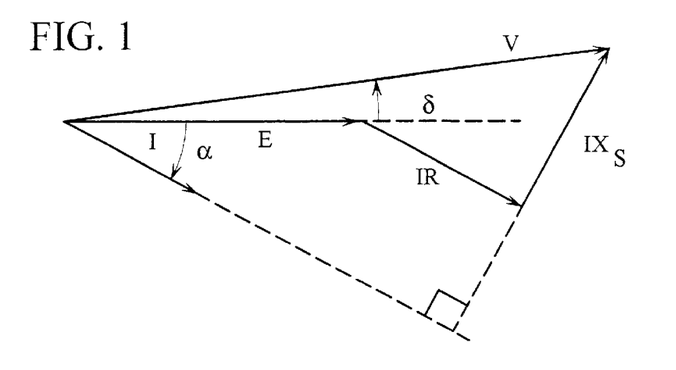
FIG. 1 depicts a phasor diagram for a PM motor.

Referring now to FIG. 1, in a motor drive system employing phase advancing, the phase advancing angle 6 may also be calculated as a function of the input signal for torque or speed. The phase advancing angle δ is defined as the angle between the phase voltage vector V and back electromotive force (EMF) vector E. The phase voltage signals Va, Vb, Vc are then phase shifted by this phase advancing angle δ. Phase voltage command signals Va, Vb, and Vc are used to generate the motor duty cycle signals Da, Db, and Dc 32 using an appropriate pulse width modulation (PWM) technique. It is noteworthy to appreciate that the phase advance angle δ should preferably not exceed a value which may cause the angle between back emf and phase current to be more than 90 electrical degrees, as it may cause the reversal of motor torque, which in turn, may cause the reversal of motor direction. Motor duty cycle signals 32 of the controller 18 are applied to a power circuit or inverter 20, which is coupled with a power source 22 to apply modulated phase voltage signals 34 to the stator windings of the motor in response to the motor voltage command signals.

In order to perform the prescribed functions and desired processing, as well as the computations therefore (e.g., the execution of phase angle diagnostics algorithm(s) prescribed herein, motor control algorithms, and the like), controller 18 may include, but not be limited to, a processor(s), computer (s), memory, storage, register(s), timing, interrupt(s), communication interfaces, and input/output signal interfaces, as well as combinations comprising at least one of the foregoing. For example, controller 18 may include signal input signal filtering to enable accurate sampling and conversion or acquisitions of such signals from communications interfaces. Controller 18 may be implemented as a computer, typically digital, recursively executing software configured to cause the controller to perform various processes. Additional features of controller 18 and certain processes therein are thoroughly discussed at a later point herein.

In an exemplary embodiment, controller 18 determines the reasonableness of the phase angle of the motor voltage by evaluating various system parameters, commands, processing, and the like. Controller 18 receives input signals including the motor phase voltages, the commanded phase advance, and the motor position, to facilitate the processes and as a result generates one or more output signals including a fault status signal indicating an improper motor phase angle. Comprehensive monitoring and diagnostics of the control algorithm and the motor voltage phase angle may be accomplished by capturing a selected modulated phase voltage signal 34 applied to the motor 12 at particular instances of time for comparison with commanded signals.

Figure 3:
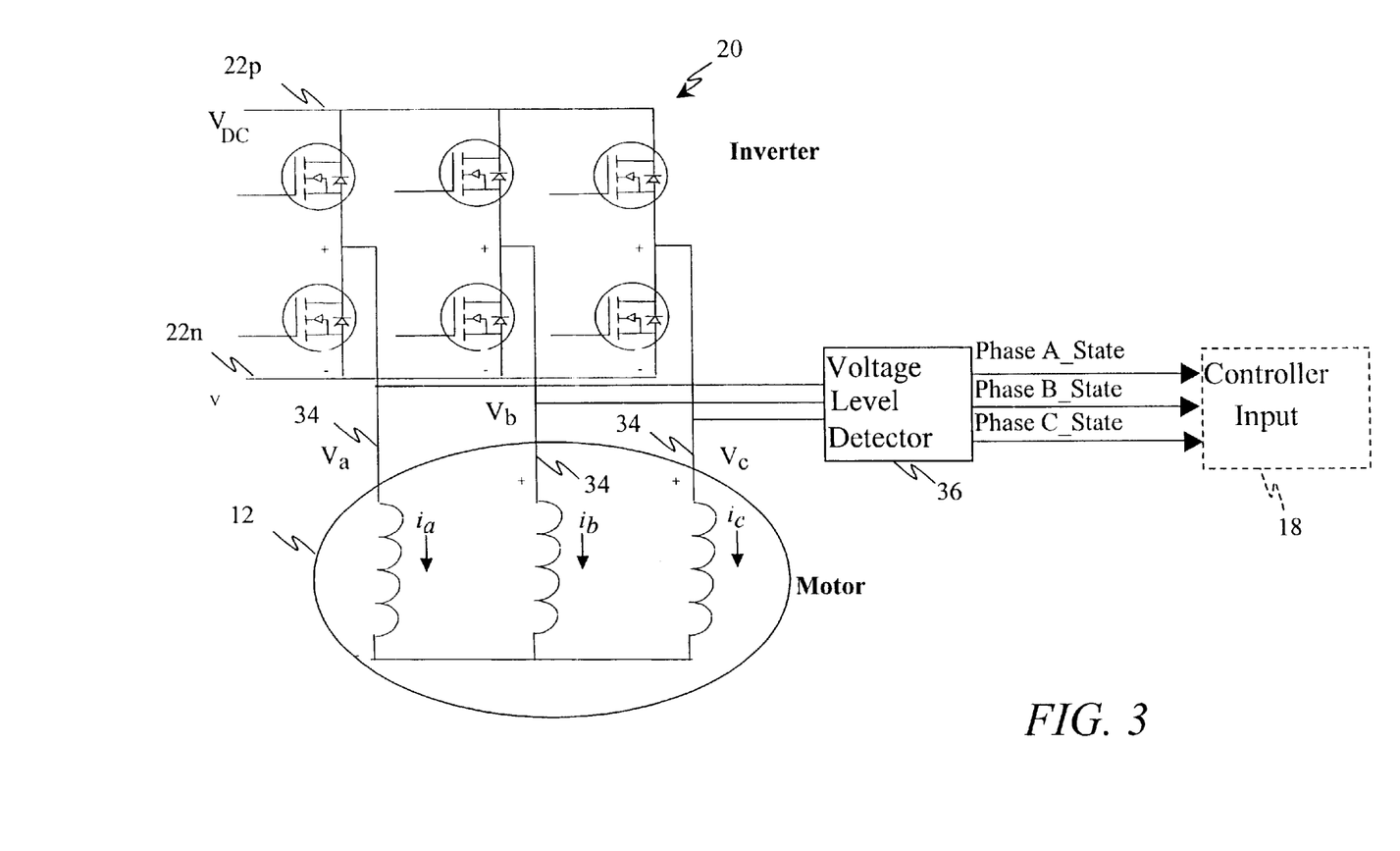
FIG. 3 depicts a partial view of a PM motor control system of an exemplary embodiment.

Turning now to FIG. 3, a partial view of system 10 is depicted including the elements for practicing the disclosed embodiments. The inverter 20 and motor 12 are shown including a voltage level detector 36 configured to sense each of the modulated phase voltage signals 34 of the motor 12 and supply a state signal to the controller 18. The inverter 20 is connected to a positive bus 22p and a negative bus 22n of the power source 22. It is noteworthy to appreciate that the controller 18 may, but need not include the inverter 20 and the voltage level detector 36. Such a configuration of the hardware elements of the system may be selected for implementation purposes only. It will be evident the numerous possible configurations and various allocations of functionality between hardware and software are possible. Such a particular configuration should be considered as illustrative only and not considered limiting to the scope of this disclosure or the claims.

Returning to FIG. 3 and as discussed earlier, the system may employ a PWM technique for applying power to the motor 12. As can be seen in FIG. 4 the phase voltage profiling functions may have a value of zero for 120 electrical degrees, therefore a zero voltage is applied across the respective motor phase during this interval. The PWM duty cycle of the respective phase during this interval is zero, therefore a selected switching device of the inverter 20 is turned on to connect a respective winding of the motor 12 to the ground or negative bus 22n of the voltage source 22. It should be noted that the relationship between the electrical rotational cycles and the mechanical rotational cycles are different by a factor of the number of poles of the motor 12 divided by two. For example, in a six pole motor design as discussed with the exemplary embodiment, the electrical frequency and the mechanical frequency differ by a factor of three. It should also be noted that since the electrical cycle repeats three times per mechanical cycle, signals that are generated as a function of the electrical position (e.g., the reference transition) actually represent three slightly different points on the mechanical cycle. Moreover, it is noteworthy to appreciate that for the motor 12 in an exemplary embodiment, the electrical cycles are substantially identical to one another.

As stated earlier, the inverter 20 may be configured to connect selected phases of the motor 12 to ground under selected conditions and during this condition no PWM switching occurs. Under such conditions, e.g., when a selected phase is grounded, the respective modulated phase voltage signal 34 is observed for voltage transitions or PWM switching. Should PWM switching be observed on the selected phase, a fault status is generated and logged.

Moreover, to ensure that the voltage level detector 36 is properly operating, the modulated phase voltage signals 34 are also observed under additional selected conditions when the PWM switching is expected to be observed, and thereby, a secondary check of the acceptable performance of the hardware is achieved.

FIG. 4 provides a diagrammatic view of the signals employed and the concepts presented. The waveforms represent an ideal case depicting the phase voltages of the motor as a function of an offset and phase advance corrected electrical position for clockwise rotation. In other words, a view of the expected motor phase voltages. For example, in the ideal case, the zero crossing for the Phase A voltage applied to the motor and the zero count point for the position sensing including offsets and phase advance occur simultaneously. Should a shift from such a base line be observed, a phase angle error has been introduced and may be detected and thereafter a fault indicated. Returning to FIG. 4, the horizontal axis is graduated and scaled in counts equivalent to a complete 360 electrical degrees (or one third of a mechanical rotation for a six pole motor). It should be evident that under a PWM scheme, the modulation occurs in a manner to assure that the requested voltage magnitude is supplied to the motor. Therefore, for example, if the Phase A waveform is observed, it should be evident that from count 0 to count 128 the PWM switching is occurring and from count 128 to 192 the phase is grounded and therefore no switching should be observed. Likewise, if the Phase B waveform is observed, it should be evident that from count 64 to count 192 the PWM switching is occurring and from count 0 to 64 the phase is grounded and therefore no switching should be observed. Finally, if the Phase C waveform is observed, it should be evident that from count 0 to count 64 and 128 to 192 the PWM switching is occurring and from count 64 to 128 the phase is grounded and therefore no switching should be observed.

Therefore, it will be appreciated, that if a selected phase is observed at the appropriate time or interval and compared with the expected phase voltages and expected status it may be determined whether a selected phase is receiving commanded voltage (PWM switched voltage) as opposed to grounded. If it is ascertained that a particular phase is switching when it is not expected to be, or not switching when it is expected to be switching, a fault may be logged indicating a phase angle error in the voltages applied to the motor 12. In an exemplary embodiment, an interval is defined for the observation of each of phase in the active or switching state (when a voltage is supplied) and in the inactive or grounded state. It may be further evident that the interval may be configured to increase the robustness of the comparisons by shifting the interval within the duration of the characteristic to be observed and tested. In an exemplary embodiment, the observation interval is denoted as a sector and is substantially centered in the overall interval of the expected occurrence. For example, with attention to the Phase A waveform, the sector for testing the Phase A switching may be centered in the interval of switching namely from about count 48 to about count 80 out of the span from approximately count 0 to count 128. Likewise, the sector for testing the Phase A grounded is centered in the interval of switching namely from about count 144 to about count 176 out of a span from approximately count 128 to 192. Similar sectors may be defined for Phases B and C for both the switching and grounded conditions. Finally, a similar set of sectors may be defined in a similar manner for counter clockwise rotation. FIG. 4 also identifies the sectors and expected status for each state or condition.

Figure 5:
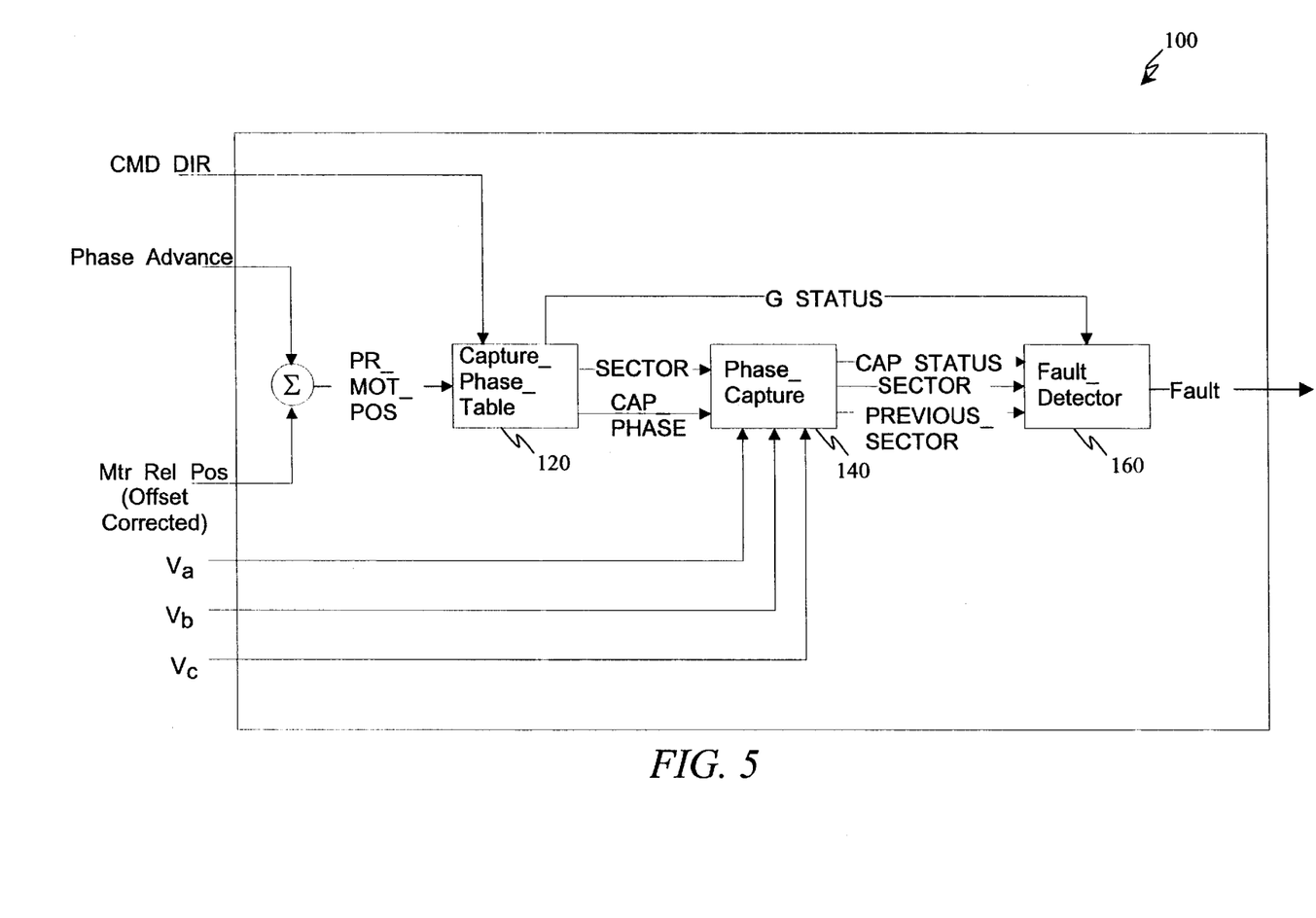
FIG. 5 is a simplified block diagram depicting an exemplary embodiment of the phase angle diagnostics algorithm (s)

FIG. 5 is a block diagram depicting an algorithm as may be employed for an exemplary embodiment of the phase angle diagnostics. The phase angle diagnostics algorithm 100 includes three primary processes. In an exemplary embodiment the first is configured as a look up table and denoted capture_phase_table 120 configured to facilitate determination of the expected or commanded phase information (e.g., A, B, or C), the status for each phase, and the operating sector. The second process is denoted phase_capture 140, which executes the processing for capturing the respective modulated phase voltage signals 34 during the selected intervals and comparing the resulting status with the expected status from the capture_phase_table 120. Finally, the third process fault_detector 160 compares the expected results of the input capture from the status with a measured state from the input capture from the modulated phase voltage signals 34. A fault indication is output if a miscompare is evident.

Figure 6:
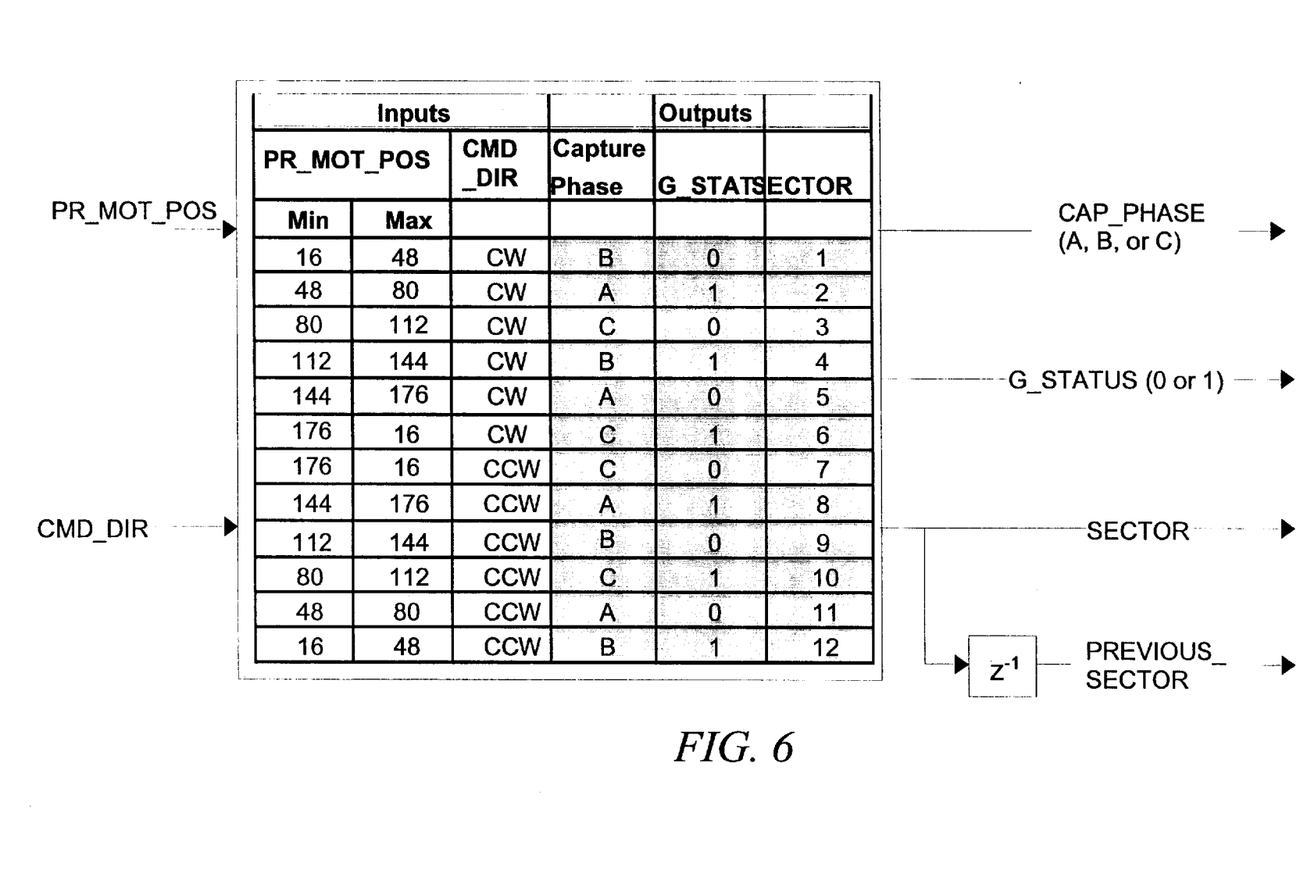
FIG. 6 depicts an exemplary embodiment of a capture_phase_table.

The processing executed at the capture_phase_table 120 depicted in FIG. 6 includes receiving signal indicative of the commanded motor direction, denoted CMD_DIR. It should be evident that there are a variety of methods for ascertaining the commanded motor direction. For example the commanded motor direction may be ascertained from sensors, existing processing, additional algorithms, and the like, including combinations of the foregoing. In an exemplary embodiment, it is determined from existing processing not directly related to that disclosed herein yet readily available. A second input to the capture_phase_table 120 processing is a value indicative of a composite motor position denoted PR_MOT_POS, which is the resultant of a summation of a offset corrected relative motor position denoted Mtr_Rel_Pos and the current phase advance command denoted Phase_Advance in the figure. PR_MOT_POS may be implemented as a counter value including a repeating range of 0–191 counts, representative of a relative motor position of 0–360 degrees electrical.

Turning once again to the output of the process capture_phase_table 120, which is configured to provide three outputs as depicted in FIGS. 4 and 5. First, CAPTURE_PHASE denoting a value indicative of which of the modulated phase voltage signals 34 is to be selected and measured. Second, G_STATUS denoting a status value indicative of the expected state of the input, with zero (0) indicating the selected phase is grounded and one (1) indicating the phase is being switched. Finally, SECTOR denotes a value indicative of the particular sector of operation. As stated earlier, in an exemplary embodiment, a sector is assigned for the full electrical rotation of the motor in both directions, yielding twelve sectors, 6 for each direction. As state above, SECTOR indicates a unique combination of PR_MOT_POS range and CMD_DIR. The algorithm uses the current SECTOR value with the last sector value denoted PREVIOUS_SECTOR to determine if the algorithm is allowed to perform the fault detection (See Fault Detection disclosure at a later point herein). Controller 18 may store the sector information from the previous cycles for comparison purposes.

The capture_phase_table 120 functionality is depicted in FIG. 6. It is noteworthy to appreciate that the information depicted in the table regarding minimum and maximum values are exemplary and not restrictive. Depending upon the implementation, differing values are possible. In an exemplary embodiment, the values depicted are a function of having selected evenly distributed equal length sectors for the capture. It should be evident, the sectors could be defined in a manner which may dictate other variations.

Phase_Capture

Figure 7:
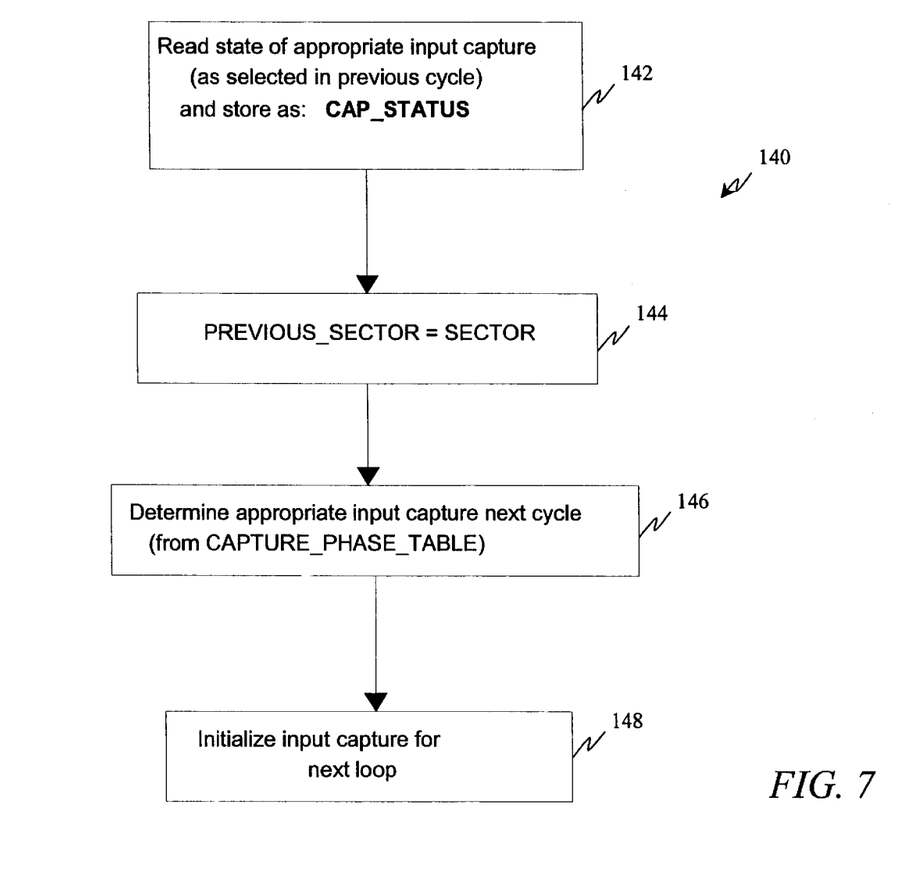
FIG. 7 is a flow chart depicting the process phase_capture.

FIG. 7 depicts a flow chart depicting the process phase_capture 140. At block 142 the states of the input(s) namely the selected modulated phase voltage signals 34 (e.g., one of the three) are observed for PWM switching. If switching is detected, a variable indicative of the actual status of the captured modulated phase voltage signal 34 denoted CAP_STATUS is set. The PREVIOUS_SECTOR value is updated with a current SECTOR value for a particular controller execution cycle in preparation for the next cycle, as depicted at block 144. At block 146, the next modulated phase voltage signal 34 to be observed is selected. Finally, at block 148 the sector and phase for the next control cycle. The capture_phase_table 120 provides the information as to the motor phase to select.

In an exemplary embodiment, a selected phase is observed for the occurrence of PWM switching. It should be readily apparent, that the modulated phase voltage signal 34 itself could be sampled and captured or further yet all three modulated phase voltage signals 34 could be sampled. The exemplary embodiment is illustrated by an implementation, which should be considered as illustrative only and not necessarily limiting to the scope of the invention or claims. Moreover, the phase_capture process implements two techniques to provide robustness and reduce susceptibility due to noise on the modulated phase voltage signal 34 inputs. First, the modulated phase voltage signals are only observed during the length of the defined sector as opposed to the entire duration of which switching should be detected. For example, referring to FIG. 4 phase B is tested for ground in the duration of position from count 16 to 48 rather than the entire duration of counts 0 to 64 where phase B is theoretically grounded. This scheme allows for some variation in the position sensing, phase voltage generation, and avoids nuisance faults. The second technique applies to determining whether the input is grounded or switched. It is desirable, but not necessary, to specifically detect the PWM switching and yet avoid undesirable noise pulses. In many control schemes, the duration of a control loop cycle may be equal to a number of PWM cycles. In the present embodiment, the duration of PWM cycle is about 50 microseconds while the control loop cycle is 2 milliseconds. During a switching sector of a particular phase a number of transitions may be observed which, allows avoidance of a false fault detection caused by detection of a noise pulse. To facilitate this technique, when an edge of a PWM switching pulse is detected on the selected modulated phase voltage signal 34, the time is measured to the occurrence of a second edge. If the time is substantially similar to the PWM switching period, the CAP_STATUS is set. In this manner, a scheme for distinguishing between noise and actual PWM switching is achieved. In an exemplary embodiment, the PWM switching employs a 50 microsecond period, therefore two pulses occurring in a 50 microsecond duration are considered as having detected PWM switching.

Fault_Detection

Turning now to the processing depicted at the process fault_detector 160, the fault_detector 160 compares the expected result or state of the input capture (G_STATUS) against the measured state of the input capture (CAP_STATUS). If a difference is detected a fault is declared. Table 1 depicts an example of fault handling for an exemplary embodiment.

TABLE 1

Fault Determination

| G_STATUS | CAP_STATUS | Phase Fault |
|---|---|---|
| 1 | 1 | 0 |
| 1 | 0 | 1 |
| 0 | 1 | 1 |
| 0 | 0 | 0 |

The processing of the fault_detector 160 may be inhibited under selected conditions. For example, when it is known that the measurements are not as robust, or when other characteristics indicate identification of a fault would be unwarranted. In an exemplary embodiment, the processing of the fault_detector 160 is not performed when any of the following conditions are present: A modulation index denoted Mod_Idx is less than a selected threshold, in other words, the expected or commanded magnitude of the sinusoidal voltages is less than a selected threshold; the variable SECTOR is not equal to the variable PREVIOUS_SECTOR as established and modified in the phase_capture 140 process discussed above, indicating operation is now in a different sector and therefore a comparison or fault determination would be misleading; or the motor control system 10 is in the disable state, indicative of a fault elsewhere. It is noteworthy to appreciate that the modulation index denoted Mod_Idx is a variable proportional to the commanded magnitude of the sinusoidal voltages. Similarly, it is also proportional to $V_{ref}$ as depicted in FIG. 2.

Controller 18 may include processing to implement an error accumulation strategy for the detected fault. Such a fault accumulation strategy may include a fault counter that increments by a first selected amount with the presence of a fault in each controller cycle and decrements by a second selected step with each controller cycle absent of a fault. Such a fault counter may be also be compared to a selected limit value, where exceeding the limit value indicates a fault to be reported or annunciated as depicted at 160. A fault count less than the limit value is indicative of a no fault condition and the diagnostics may continue.

It will be appreciated that while the disclosed embodiments refer in several instances, to a configuration utilizing look-up tables in implementation, such a reference is illustrative only and not limiting. Various alternatives will be apparent to those skilled in the art. For example, the processes and algorithms described above could employ, in addition to, or in lieu of, look-up tables, direct algorithms, gain or parameter scheduling, linearized interpolation or extrapolation, and/or various other methodologies, which may facilitate execution of the desired functions and the like, as well as combinations thereof. It should further be noted that the particular configurations of the lookup table(s) are once again, illustrative only, a variety of other configurations or element allocations are feasible. For example, while a two input, three-output table has been selected in an embodiment, a table with a greater number of inputs, outputs, or elements for either of the independent inputs may yield more accurate determinations at the expense of table complexity and computation time. Likewise, a table employing a lesser number of inputs, outputs, and elements may prove simpler and save computation time, but may also reduce the accuracy of the computations.

In the manner described above, the motor phase voltage phase angle diagnostics for a PM electric machine may be ascertained. Thereby, enhancing motor diagnostics not previously available. The disclosed invention can be embodied in the form of computer or controller implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The present invention can also be embodied in the form of computer program code, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for phase angle diagnostics in a sinusoidally excited PM electric machine, the method comprising:

receiving a position value indicative of the rotational position of said electric machine;

receiving a phase advance value indicative of a commanded phase advance angle;

determining an expected phase voltage and expected status thereof;

observing a selected phase voltage signal and determining an actual status corresponding thereto; and comparing said expected status and said actual status.

2. The method of claim 1 wherein said position value is corrected for offset errors to compensate for a difference between measured relative position and a selected reference position.

3. The method of claim 1 wherein said expected status comprises a status value, said status value corresponding a state of a selected phase, and wherein said state is one of switching or grounded.

4. The method of claim 1 wherein said determining is responsive to a command direction and a combination of said phase advance value and said position value.

5. The method of claim 4 wherein said determining is implemented by a lookup table.

6. The method of claim 1 wherein said determining comprises at least one of establishing sectors, establishing a selected phase, and establishing a status value for said selected phase.

7. The method of claim 6 wherein said sectors comprise segmented portions of an electrical cycle configured to identify an interval for said observing.

8. The method of claim 6 wherein said sectors are configured to enhance robustness of said determining.

9. The method of claim 6 wherein said sectors comprise 60 electrical degree segments.

10. The method of claim 1 wherein said observing comprises capturing a selected phase voltage signal if switching is detected.

11. The method of claim 10 wherein said determining an actual status includes measuring a time duration between adjacent pulses of said switching and identifying an actual status variable as set if said time duration is substantially equal a pulse width modulation period.

12. The method of claim 11 wherein a phase angle fault is annunciated if said fault accumulator exceeds a selected threshold.

13. The method of claim 1 wherein said determining an actual status comprises identifying an actual status variable as set if switching is detected.

14. The method of claim 1 wherein said comparing comprises declaring a phase angle fault if said comparing yields a miscompare between said expected status and said actual status.

15. The method of claim 1 further including annunciating a phase angle fault if said comparing yields a miscompare between said expected status and said actual status.

16. The method of claim 1 further including a fault accumulator wherein said a phase angle fault increments said fault accumulator by a first selected step size and absence of a phase angle fault decrements said fault accumulator by a second selected step size.

17. The method of claim 2 wherein said expected status comprises a status value, said status value corresponding a state of a selected phase, and wherein said state is one of switching or grounded.

18. The method of claim 17 wherein said determining is responsive to a command direction and a combination of said phase advance value and said position value.

19. The method of claim 18 wherein said determining includes a lookup table.

20. The method of claim 19 wherein said observing comprises capturing a selected phase voltage signal if switching is detected.

21. The method of claim 20 wherein said determining an actual status comprises identifying an actual status variable as set if switching is detected.

22. The method of claim 21 wherein said comparing comprises declaring a phase angle fault if said comparing yields a miscompare between said expected status and said actual status.

23. The method of claim 22 further including annunciating a phase angle fault if said comparing yields a miscompare between said expected status and said actual status.

24. The method of claim 23 further including a fault accumulator wherein said a phase angle fault increments said fault accumulator by a first selected step size and absence of a phase angle fault decrements said fault accumulator by a second selected step size.

25. A system for phase angle diagnostics in a sinusoidally excited PM electric machine, the system comprising:
a PM electric machine;
a position sensor configured to measure a rotor position of said electric machine and transmit a position signal;
a controller, said controller receiving said position signal, and obtaining a phase advance value indicative of a commanded phase advance angle;
said controller executing a process comprising determining an expected phase voltage and expected status, observing a selected phase voltage signal and determining an actual status corresponding thereto, comparing said expected status and said actual status.

26. The system of claim 25 wherein said position value is corrected for offset errors to compensate for a difference between measured relative position and a selected reference position.

27. The system of claim 25 wherein said expected status comprises a status value, said status value corresponding a state of a selected phase, and wherein said state is one of switching or grounded.

28. The system of claim 27 wherein said determining is implemented by a lookup table.

29. The system of claim 25 wherein said actual status is responsive to a command direction and a combination of said phase advance value and said position value.

30. The system of claim 25 wherein said determining an actual status comprises at least one of, establishing sectors, establishing a selected phase, and establishing a status value for said selected phase.

31. The system of claim 30 wherein said sectors comprise segmented portions of an electrical cycle configured to identify an interval for said observing.

32. The system of claim 30 wherein said sectors are configured to enhance robustness of said determining.

33. The system of claim 30 wherein said sectors comprise 60 electrical degree segments.

34. The system of claim 25 wherein said observing comprises capturing a selected phase voltage signal if switching is detected.

35. The system of claim 34 wherein said determining an actual status includes measuring a time duration between adjacent pulses of said switching and identifying an actual status variable as set if said time duration is substantially equal a pulse width modulation period.

36. The system of claim 35 wherein a phase angle fault is annunciated if said fault accumulator exceeds a selected threshold.

37. The system of claim 25 wherein said determining an actual status comprises identifying an actual status variable as set if switching is detected.

38. The system of claim 25 wherein said comparing comprises declaring a phase angle fault if said comparing yields a miscompare between said expected status and said actual status.

39. The system of claim 25 further including annunciating a phase angle fault if said comparing yields a miscompare between said expected status and said actual status.

40. The system of claim 25 further including a fault accumulator wherein said a phase angle fault increments said fault accumulator by a first selected step size and absence of a phase angle fault decrements said fault accumulator by a second selected step size.

41. The system of claim 26 wherein said expected status comprises a status value, said status value corresponding a state of a selected phase, and wherein said state is one of switching or grounded.

42. The system of claim 41 wherein said determining is responsive to a command direction and a combination of said phase advance value and said position value.

43. The system of claim 42 wherein said determining includes a lookup table.

44. The system of claim 43 wherein said observing comprises capturing a selected phase voltage signal if switching is detected.

45. The system of claim 44 wherein said determining an actual status comprises identifying an actual status variable as set if switching is detected.

46. The system of claim 45 wherein said comparing comprises declaring a phase angle fault if said comparing yields a miscompare between said expected status and said actual status.

47. The system of claim 46 further including annunciating a phase angle fault if said comparing yields a miscompare between said expected status and said actual status.

48. The system of claim 47 further including a fault accumulator wherein said a phase angle fault increments said fault accumulator by a first selected step size and absence of a phase angle fault decrements said fault accumulator by a second selected step size.

49. A storage medium encoded with a machine-readable computer program code for phase angle diagnostics in a sinusoidally excited PM electric machine, said storage medium including instructions for causing controller to implement a method comprising:

receiving a position value indicative of the rotational position of said electric machine;

receiving a phase advance value indicative of a commanded phase advance angle;

determining an expected phase voltage and expected status thereof;

observing a selected phase voltage signal and determining an actual status corresponding thereto; and comparing said expected status and said actual status.

50. The storage medium of claim 49 wherein said position value is corrected for offset errors to compensate for a difference between measured relative position and a selected reference position.

51. The storage medium of claim 49 wherein said expected status comprises a status value, said status value corresponding a state of a selected phase, and wherein said state is one of switching or grounded.

52. The storage medium of claim 49 wherein said determining is responsive to a command direction and a combination of said phase advance value and said position value.

53. The storage medium of claim 52 wherein said determining is implemented by a lookup table.

54. The storage medium of claim 49 wherein said determining comprises at least one of establishing sectors, establishing a selected phase, and establishing a status value for said selected phase.

55. The storage medium of claim 54 wherein said sectors comprise segmented portions of an electrical cycle configured to identify an interval for said observing.

56. The storage medium of claim 54 wherein said sectors are configured to enhance robustness of said determining.

57. The storage medium of claim 54 wherein said sectors comprise 60 electrical degree segments.

58. The storage medium of claim 49 wherein said observing comprises capturing a selected phase voltage signal if switching is detected.

59. The storage medium of claim 58 wherein said determining an actual status includes measuring a time duration between adjacent pulses of said switching and identifying an actual status variable as set if said time duration is substantially equal a pulse width modulation period.

60. The storage medium of claim 59 wherein a phase angle fault is annunciated if said fault accumulator exceeds a selected threshold.

61. The storage medium of claim 49 wherein said determining an actual status comprises identifying an actual status variable as set if switching is detected.

62. The storage medium of claim 49 wherein said comparing comprises declaring a phase angle fault if said comparing yields a miscompare between said expected status and said actual status.

63. The storage medium of claim 49 further including annunciating a phase angle fault if said comparing yields a miscompare between said expected status and said actual status.

64. The storage medium of claim 49 further including a fault accumulator wherein said a phase angle fault increments said fault accumulator by a first selected step size and absence of a phase angle fault decrements said fault accumulator by a second selected step size.

65. The storage medium of claim 50 wherein said expected status comprises a status value, said status value corresponding a state of a selected phase, and wherein said state is one of switching or grounded.

66. The storage medium of claim 65 wherein said determining is responsive to a command direction and a combination of said phase advance value and said position value.

67. The storage medium of claim 66 wherein said determining includes a lookup table.

68. The storage medium of claim 67 wherein said observing comprises capturing a selected phase voltage signal if switching is detected.

69. The storage medium of claim 68 wherein said determining an actual status comprises identifying an actual status variable as set if switching is detected.

70. The storage medium of claim 69 wherein said comparing comprises declaring a phase angle fault if said comparing yields a miscompare between said expected status and said actual status.

71. The storage medium of claim 70 further including annunciating a phase angle fault if said comparing yields a miscompare between said expected status and said actual status.

72. The storage medium of claim 71 further including a fault accumulator wherein said a phase angle fault increments said fault accumulator by a first selected step size and absence of a phase angle fault decrements said fault accumulator by a second selected step size.

73. A computer data signal embodied in a carrier wave for phase angle diagnostics in a sinusoidally excited PM electric machine, said data signal comprising code configured to cause a controller to implement a method comprising:

receiving a position value indicative of the rotational position of said electric machine;

receiving a phase advance value indicative of a commanded phase advance angle;

determining an expected phase voltage and expected status thereof;

observing a selected phase voltage signal and determining an actual status corresponding thereto; and comparing said expected status and said actual status.

74. The computer data signal of claim 73 wherein said position value is corrected for offset errors to compensate for a difference between measured relative position and a selected reference position.

75. The computer data signal of claim 73 wherein said expected status comprises a status value, said status value corresponding a state of a selected phase, and wherein said state is one of switching or grounded.

76. The computer data signal of claim 73 wherein said determining is responsive to a command direction and a combination of said phase advance value and said position value.

77. The computer data signal of claim 76 wherein said determining is implemented by a lookup table.

78. The computer data signal of claim 73 wherein said determining comprises at least one of establishing sectors, establishing a selected phase, and establishing a status value for said selected phase.

79. The computer data signal of claim 78 wherein said sectors comprise segmented portions of an electrical cycle configured to identify an interval for said observing.

80. The computer data signal of claim 78 wherein said sectors are configured to enhance robustness of said determining.

81. The computer data signal of claim 78 wherein said sectors comprise 60 electrical degree segments.

82. The computer data signal of claim 73 wherein said observing comprises capturing a selected phase voltage signal if switching is detected.

83. The computer data signal of claim 82 wherein said determining an actual status includes measuring a time duration between adjacent pulses of said switching and identifying an actual status variable as set if said time duration is substantially equal a pulse width modulation period.

84. The computer data signal of claim 83 wherein a phase angle fault is annunciated if said fault accumulator exceeds a selected threshold.

85. The computer data signal of claim 73 wherein said determining an actual status comprises identifying an actual status variable as set if switching is detected.

86. The computer data signal of claim 73 wherein said comparing comprises declaring a phase angle fault if said comparing yields a miscompare between said expected status and said actual status.

87. The computer data signal of claim 73 further including annunciating a phase angle fault if said comparing yields a miscompare between said expected status and said actual status.

88. The computer data signal of claim 73 further including a fault accumulator wherein said a phase angle fault increments said fault accumulator by a first selected step size and absence of a phase angle fault decrements said fault accumulator by a second selected step size.

89. The computer data signal of claim 74 wherein said expected status comprises a status value, said status value corresponding a state of a selected phase, and wherein said state is one of switching or grounded.

90. The computer data signal of claim 89 wherein said determining is responsive to a command direction and a combination of said phase advance value and said position value.

91. The computer data signal of claim 90 wherein said determining includes a lookup table.

92. The computer data signal of claim 91 wherein said observing comprises capturing a selected phase voltage signal if switching is detected.

93. The computer data signal of claim 92 wherein said determining an actual status comprises identifying an actual status variable as set if switching is detected.

94. The computer data signal of claim 93 wherein said comparing comprises declaring a phase angle fault if said comparing yields a miscompare between said expected status and said actual status.

95. The computer data signal of claim 94 further including annunciating a phase angle fault if said comparing yields a miscompare between said expected status and said actual status.

96. The computer data signal of claim 95 further including a fault accumulator wherein said a phase angle fault increments said fault accumulator by a first selected step size and absence of a phase angle fault decrements said fault accumulator by a second selected step size.

* * * * *